Figure 1:
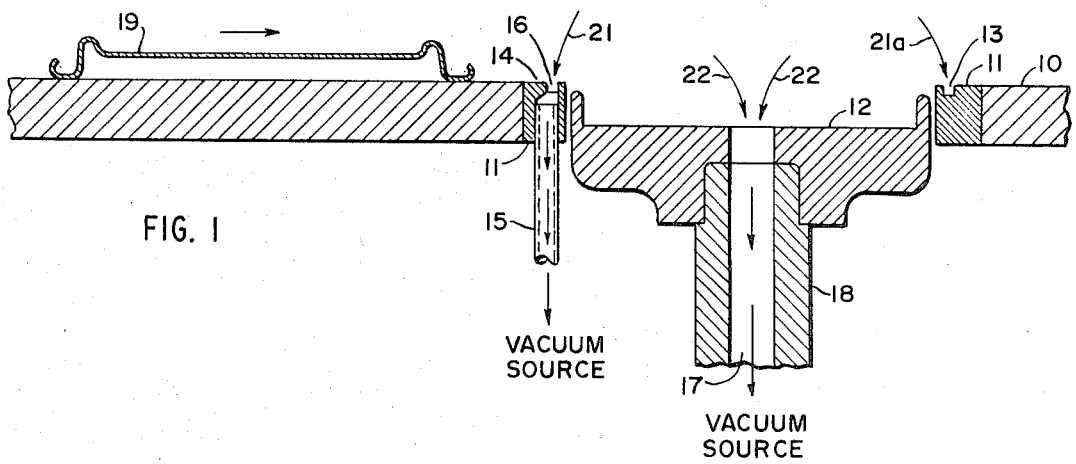

United States Patent

[11] 3,568,633

[72] Inventors: William B. Harrison
8 Ridley Road, Dedham, Mass. 02026;
Clifford F. Tirrell, 2 Mac Dongall Court, Weymouth, Mass. 02190; James J. Rosati, 10 Walker Road, North Andover, Mass. 01845
[21] Appl. No.: 776,721
[22] Filed: Nov. 18, 1968
[45] Patented: Mar. 9, 1971

[54] DEVICE FOR ARRESTING CONTAINER CLOSURES ON LINING MACHINES
2 Claims, 4 Drawing Figs.

[52] U.S. Cl. ................................................ 118/50, 279/3
[51] Int. Cl. .............................................. G07c 13/00
[50] Field of Search ........................................ 279/3; 269/21; 51/235; 214/(Inquired); 18/(Cap & Seal Dig.); 117/(Inquired)

[56] References Cited
UNITED STATES PATENTS

| | | | |
|---|---|---|---|
| 1,353,966 | 9/1920 | Lorenz | 279/3UXL |
| 2,051,662 | 8/1936 | Wells | 279/3X |
| 2,066,130 | 12/1936 | Von Hofe et al. | 279/3X |
| 2,444,531 | 7/1948 | Richardson | 51/235 |
| 3,333,571 | 8/1967 | Kokinda | 279/3X |
| 3,445,262 | 5/1969 | Greck et al. | 18/Cap & Seal Dig. |

*Primary Examiner*—Morris Kaplan
*Attorneys*—Metro Kalimon, William L. Baker and Theodore C. Browne ABSTRACT: Closures and small parts being fed to a rotary chuck where a gasketing compound is applied are arrested from overrunning the chuck by a curtain of air which closely surrounds the chuck periphery. Forward momentum is checked as the closure is pushed through the air wall onto the chuck. Full arrest occurs as the leading edge of the closure meets the opposite air wall. Closures are then held on the chuck by differential air pressure.

INVENTORS
WILLIAM B. HARRISON
CLIFFORD F. TIRRELL
JAMES J. ROSATI

DEVICE FOR ARRESTING CONTAINER CLOSURES ON LINING MACHINES

This invention relates to an arresting device designed to prevent small metal parts automatically fed onto a rotating or stationary chuck from overrunning the chuck and causing misfeeds or jams. The means for arresting the forward motion of these light parts find particular application in container closure lining machines where can ends, jar caps, and other closures are fed to a rotating chuck. As the chuck turns, sealing composition is ejected into the closure through a "lining nozzle" which is positioned above the chuck and is accurately centered by a feed plate or feed bars.

Using the lining of can ends as an example, the unlined ends are fed to the chuck, usually by a feed plate or by feed bars which push the end ahead. In either instance, the ends pick up a certain velocity, and may overrun the chuck. Since mechanical apparatus such as a slide with spaced fingers or a star wheel removes the end from the chuck after the sealing composition has been ejected into the end, the mispositioning of the end is a frequent cause of jams. A device which prevents the end from occupying any other than a properly centered position on the chuck would contribute greatly to the dependability of operation of closure lining machines.

In addition to closures, many mechanical parts are also provided with sealing compositions, etc., and since these small parts frequently have unstable shapes, they are quite difficult to handle. Chuck overrunning and cocking at odd angles which has plagued the feeding of such small parts can be prevented by the present invention when suitable designed chucks are used.

The objects of the present invention are to arrest the forward motion of can ends; to hold them on the chuck firmly and exactly centered; to eliminate the holddown pad; to keep the entire surface of the can end unobstructed and exposed so that not only may can sealing compound be ejected into the channel of the can end, but a can coating may be sprayed over the entire panel; to avoid any mechanical stops or cam-operated means which previously have been used as positive stop mechanisms; and to hold the closures securely in the centered position, all despite the chuck's rapid revolution.

In past machines, frequently mechanical stops have complicated the effect of a jam, for when a misfeed occurs, the metal can be wedged and bent by the stop mechanism. Also, the necessity for using a holddown pad which fits inside the shoulder portions of the can end when the end is centered on the chuck has prevented the simultaneous performance of two functions; one of which is lining the channel with a sealing composition, and the other is coating the exposed surface of the can end with an enamel or special protective coatings.

We have discovered that it is possible to arrest closures dependably and conduct these two operations on the can end practically simultaneously, place a lining compound in the channel of the end, and coat the panel portion of the closure with lacquer or enamel. Previously, two separate steps have been required.

We have discovered that we can feed can ends and like closures dependably onto a rotating chuck and hold them in centered position on the chuck if the workpiece, as it is pushed into the proper position, meets a curtain of moving air surrounding the periphery of the chuck. This air curtain, first meeting the leading edge of the closure, checks its excess velocity and immediately afterwards, when the leading edge of the closure meets the air curtain on the far side of the chuck, further lateral movement is sharply resisted. As a result, closures take up exactly centered positions without holddown pads or mechanical guide means.

Figure 2:
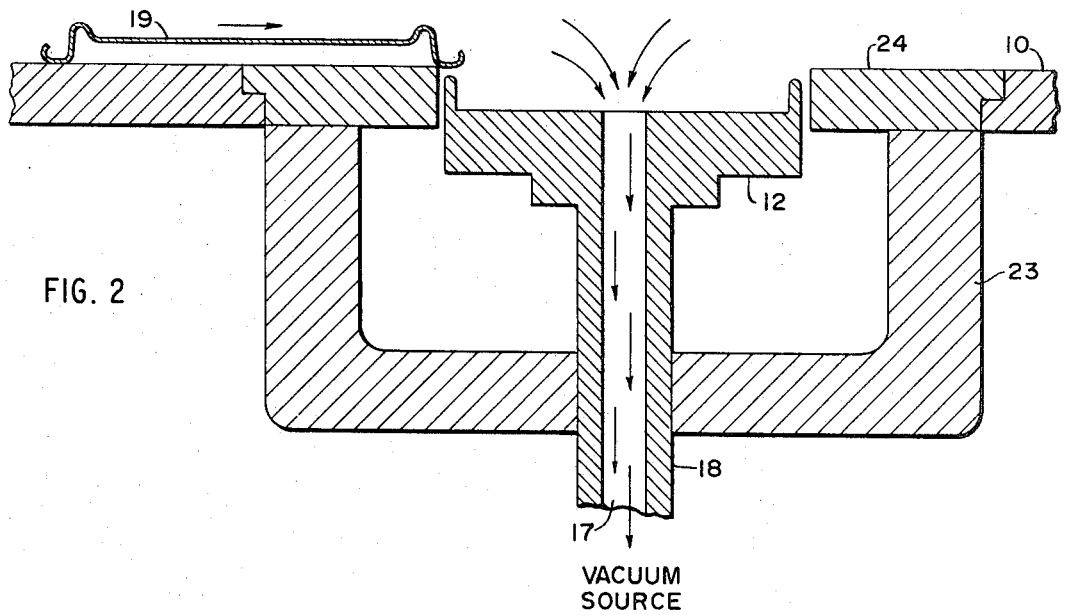
Figure 3:
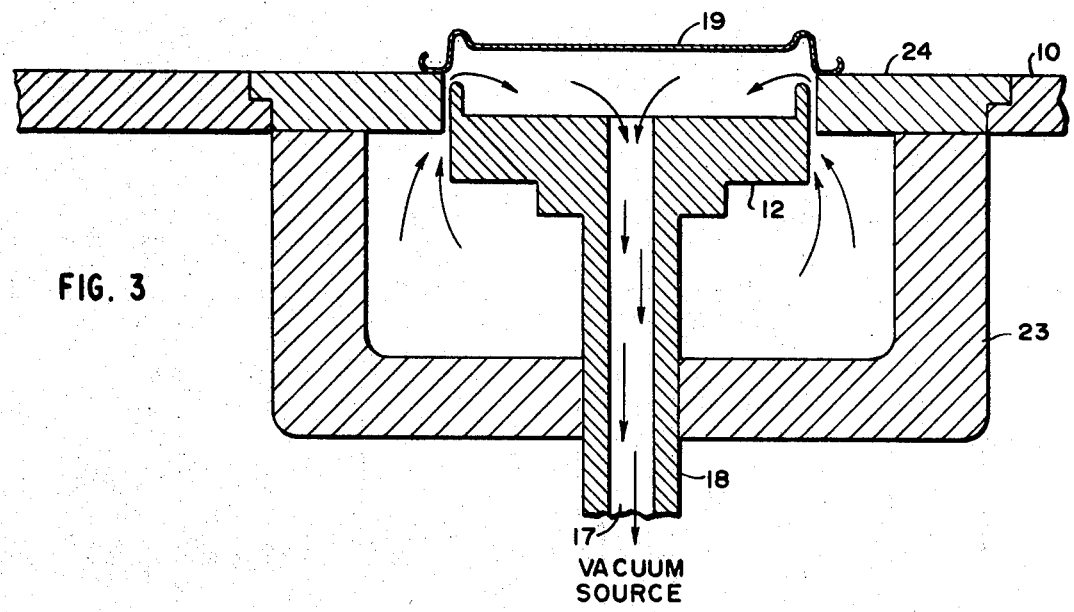
Figure 4:
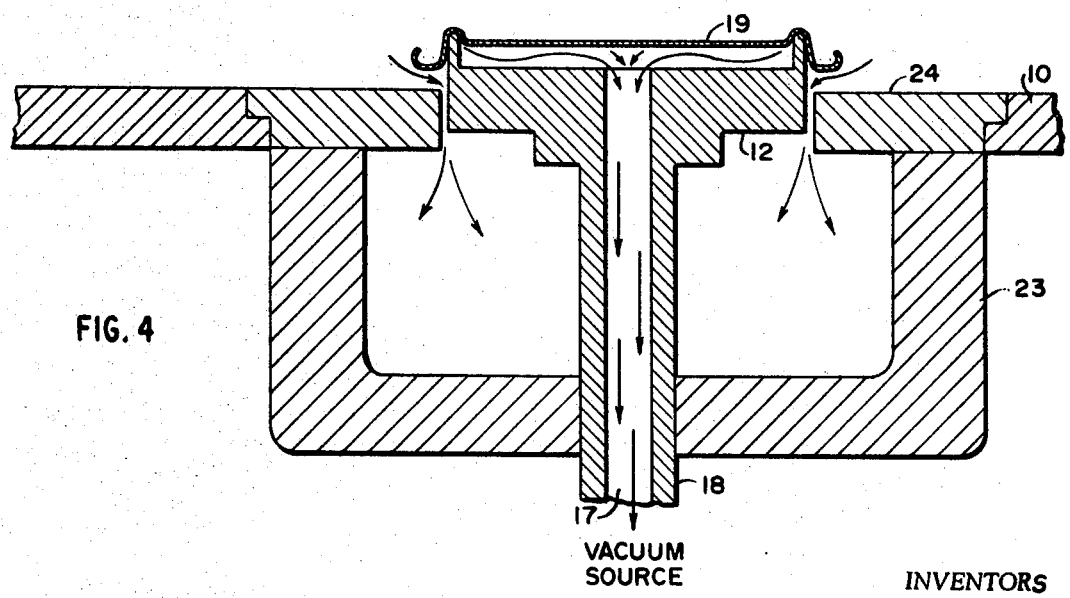

In the drawings:

FIG. 1 is a vertical sectional view showing the chuck spindle and air curtain ring; and FIGS. 2, 3 and 4 illustrate in vertical section an alternative form of the device, and show its action as a can closure becomes centered on the chuck and is lined or coated as the chuck lifts.

The use of vacuum chucks has become quite common now that nonmagnetic metals often are used for closures. In FIG. 1, the worktable, 10, of a closure lining machine is provided with a removable ring, 11, which closely surrounds the periphery of the rotatable chuck, 12. The ring, 11, is provided with a channel, 13, which, at the point, 14, and if necessary at other points spaced about the circumference, is connected to a tube, 15, leading to the same air-exhausting apparatus as that which draws air through the orifice, 16, and the bore, 17, of the chuck spindle, 18.

Accordingly, all around the chuck a curtain of air moves from the atmosphere of the room and into the channel, 13. The purpose of the removable ring, 11, is to allow the machine to operate on various sizes of closures.

The operation of the device illustrated in FIG. 1 is as follows: as the closure 19 is pushed into position on the chuck (arrow), it meets the resistance of a downward curtain of air which moves from the air of the room into the channel, 13 (curved arrows). The closure, 19, is shown about to be met on the approach side of the chuck, 12, by the downward curtain of air, 21. As the closure moves further towards a centered position, its leading edge meets the resistance of the downward curtain of air, 21a, on the opposite (right) side of the chuck. Since the closure has lost the greater part of its forward velocity in passing through the air curtain on its approach to the chuck, any remaining forward motion is checked by the air curtain as the leading edge of the closure, 19, meets the curtain at 21a. At the same time a considerable current of air as indicated by the arrows 22—22 is being drawn through the chuck, 12, and the spindle, 18. The result of the air curtain and the air flow beneath the closure into the chuck spindle, 18, causes the closure to settle back smartly and lock into position due to the difference in air pressure between the two sides of the panel portion of the closure. It should be remembered that as soon as this happens, the chuck rises, spins, and receives sealing composition in its channel, lacquer on its panel face, or both.

Stripping then occurs, for a slide or take-away fingers then move into position and, as the chuck falls breaking the vacuum, the closure is supported on the take-away fingers which move it away from the chuck.

The operation of the device illustrated in FIGS. 2, 3, and 4 is substantially the same. In this instance a small vacuum chest, 23, which can be suspended from a removable ring, 24, to permit different chuck sizes and can end diameters to be lined, surrounds the chuck. As the can end is pushed across the opening (FIG. 3), the closure bridges the orifice in the tabletop and air must flow from the small vacuum chest up around the periphery of the chuck and down through the spindle. There is a distinct centering effect as the air rushes out of the vacuum chest and into the chuck spindle. The closure snaps into position as in FIG. 1. With the starving of air in the chest and the valving off of any air flow from above as the closure fills the opening, differential air pressure holds the closure in place.

In the next stage, FIG. 4, the chuck is shown in the elevated position which allows atmospheric air to refill the small chest. The closure is removed from the chuck immediately after it has received the lining or enamel spray which is placed on the closure while the closure is rotating in the elevated position shown in FIG. 4.

Both of the above designs arrest closures and like parts dependably. They should avoid any mechanical stop means, top pads, or other devices which previously have interfered with the application of protective enamels in machines of this type. Yet they avoid any chance that lacquer or other protective coatings will be drawn into the vacuum system, for the chuck bore is sealed off and all air currents cease when the closure is seated on the chuck.

Its simplicity adds very little complication to present-day lining machines, yet the dependability of their operation when equipped with the air-arresting device contributes materially to the machine's satisfactory performance.

We claim:

1. In a lining machine including a worktable wherein a chuck sequentially receives workpieces to be lined from workpiece feeding means, means to prevent the said workpieces from overrunning or miscentering on the chuck, which includes an open-faced annulus closely surrounding said chuck, and conduit means connecting said annulus to air-displacing means whereby an annular air curtain closely adjacent to the periphery of the chuck may be established by flow of air into the said annulus; a removable ring located in the work surface of said machine and closely surrounding said chuck, said ring being provided with a channel connected to air-exhaust means whereby a curtain of air moving downwardly into said channel may be established and whereby said air flow and curtain of air are effective to prevent closures from overrunning said chuck.

2. In a lining machine including a worktable wherein a chuck sequentially receives workpieces to be lined from workpiece feeding means, an annular air passage surrounding said chuck, passages associated with said annular passage leading to air displacement means to establish an annular curtain of air passing through said annulus, the said annular air curtain being effective to resist forward movement of the closures beyond the chuck position, and to check the overrunning of closures past the said chuck, a vacuum chest in said machine wherein the said chuck in its loading position rotates below the plane of the work surface, and wherein the annulus is formed by a gap between the said chuck and the worktable of the said machine.